United States Patent [19]

Hähn et al.

[11] Patent Number: 4,748,009

[45] Date of Patent: May 31, 1988

[54] METHOD OF RECOVERING VANADIUM FROM VANADIUM-CONTAINING MATERIALS WITH AT LEAST 6 WT % OXIDIC VANADIUM COMPOUNDS

[75] Inventors: Reinhard Hähn, Schwabach-Limbach; Siegfried Sattelberger; Rudolf Fichte, both of Nuremberg; Hans-Joachim Retelsdorf, Zirndorf, all of Fed. Rep. of Germany

[73] Assignee: GfE Gesellschaft fur Elektrometallurgie mbH, Dusseldorf, Fed. Rep. of Germany

[21] Appl. No.: 914,632

[22] Filed: Oct. 2, 1986

[30] Foreign Application Priority Data

Oct. 5, 1985 [DE] Fed. Rep. of Germany ....... 3535698

[51] Int. Cl.⁴ .............................................. C01G 31/00
[52] U.S. Cl. .................................. 423/68; 75/101 R; 75/121
[58] Field of Search ................. 423/62, 68; 75/101 R, 75/121

[56] References Cited

U.S. PATENT DOCUMENTS

| 4,115,110 | 9/1978 | Pyrih et al. ........................ 75/101 R |
| 4,554,138 | 11/1985 | Marcantonio ......................... 423/62 |
| 4,645,651 | 2/1987 | Hahn et al. ............................. 423/68 |

FOREIGN PATENT DOCUMENTS 290862 6/1971 Austria .
847808 8/1952 Fed. Rep. of Germany .

*Primary Examiner*—Robert L. Stoll
*Attorney, Agent, or Firm*—Karl F. Ross; Herbert Dubno

[57] ABSTRACT

Process for the recovery of vanadium from vanadium-containing source materials under the addition of additives, especially alkali metal compounds, particularly the carbonates, chlorides, sulfates as well as nitrates and/or mixtures of these compounds, whereby the source material is ground and roasted. The roasted material is leached and whereby the withdrawn leach solution is hydrometallurgically treated for the recovery of vanadium compounds. The source materials are first roasted without the addition of alkali additives and subsequently are leached in a first leaching step. To the residues of the first leaching step are added alkali additives and the mixture is roasted in a second roasting step. The roasting products are again leached.

6 Claims, No Drawings

METHOD OF RECOVERING VANADIUM FROM VANADIUM-CONTAINING MATERIALS WITH AT LEAST 6 WT % OXIDIC VANADIUM COMPOUNDS

CROSS REFERENCE TO RELATED APPLICATION

This application is related to Ser. No. 692,022 filed Jan. 16, 1985, now U.S. Pat. No. 4,645,651, issued Feb. 24, 1987.

FIELD OF THE INVENTION

Our present invention relates to a process for the recovery of vanadium compounds from vanadium-containing materials and, more particularly, to a process for the recovery of vanadium from vanadium-containing source materials such as slag, petroleum fuel ash residue and the like containing vanadium oxide or other oxidic vanadium compounds in amounts of 6 percent by weight or more. Oxidic vanadium compounds include the vanadium oxides in free or trapped form as well as other compounds which contain both vanadium and oxygen.

The feed or source material is subjected to a first roasting in an oxidizing atmosphere, followed by leaching, and then the solids reporting in the leach residue are subjected to a second roasting in an oxidizing atmosphere at approximately 800° C.

The calcine of this second leaching step is also leached. The resultant solutions can be further treated chemically by hydrometallurgical techniques to yield vanadium compounds.

Vanadium-containing source materials include, for example, furnace blowing slags obtained in the production of steel from titaniferous magnetite, and include oil-combustion ash residues, and the like materials, hereinafter generally identified as source or feed material.

BACKGROUND OF THE INVENTION

U.S. Pat. No. 4,115,110 discloses the treatment of vanadium-containing materials such as vanadium-containing ore and scrap materials low in oxidic vanadium, for example, containing approximately 1 percent by weight of oxidic vanadium compounds. The material is subjected to a first roasting at about 600° C., and it is then roasted a second time at a temperature of approximately 800° C. Alkali compounds conventionally used in "salt roast" conversion are specifically not to be added according to the process of U.S. Pat. No. 4,115,110.

In the case of a high or oxidic vanadium compound content, the first roasting step is carried out in an atmosphere free of oxygen, compare Austrian Pat. No. 290,862. This requires special precautions, however, to preclude the access of oxygen. In general terms, the known techniques are not fully suited to recover vanadium from source materials having a high content of vanadium oxide or oxidic vanadium compounds. The prior art has only suggested processes to recover vanadium from vanadium-containing source materials with a greater content of oxidic vanadium compounds which processes are different from the method of the invention.

Thus, it has also been proposed in the prior art to combine the source material with additives, namely alkali metal compounds in the form of carbonates, chlorides, sulfates, nitrates and mixtures thereof, followed by grinding, and roasting. The roasted material is then leached, compare German Pat. No. 847,808.

The vanadium can be present in the source material in various valence states and in various states of bonding, for example as spinel-type $FeO \cdot V_2O_3$. Recovery of the vanadium values is carried out in the prior art processes by steps including: grinding the source material and adding the mentioned alkali additives. Roasting is carried out at a temperature of approximately 800° C., usually in multiple hearth furnaces. The vanadium values are liberated and oxidized by atmospheric oxygen to the pentavalent state, according to the following equation:

$$V_2O_3 + O_2 = V_2O_5 \tag{1}$$

Reaction with the alkali additives yields sodium vanadate which is soluble in water, for example according to the following examples:

$$V_2O_5 + Na_2CO_3 = 2NaVO_3 + CO_2 \tag{2}$$

$$V_2O_5 + Na_2SO_4 = 2NaVO_3 + SO_3 \tag{3}$$

This sodium vanadate product is subsequently solubilized and extracted by leaching from the calcine. The leach solutions containing the vanadium values are subsequently further subjected to hydrometallurgical and chemical techniques to recover the vanadium compounds, i.e. as $FeVO_4$, as is known in the art.

Unfortunately in such prior art processing source materials containing 6 percent or more by weight vanadium can not be directly subjected to an alkali roast. This is so because the necessary addition of large amounts of the mentioned additives would cause undesirable melting and consequent damage or obstruction of the equipment when the feed mixture is passed to the roasting step.

Addition of inert substances, for example leach residues from the processing cycle to preclude melting, will unduly dilute the source material. The practical and economic consequences of such dilution with respect to the processing are of considerable detriment, namely, reduced capacity for the roasting step, higher energy consumption for drying and heating of the extraneous material, reduced capacity for the leaching step, and an increased consumption of reagents.

OBJECTS OF THE INVENTION

It is an object of the present invention to provide a process for the recovery of vanadium from source materals containing oxidic vanadium in amounts of from about 6 percent by weight and more, which process is more energy efficient.

It is also an object of the present invention to provide a process of extracting vanadium which uses reagents and equipment in a more economical way than is achieved in prior art processing.

DESCRIPTION OF THE INVENTION

The foregoing and other objects and advantages of the invention are obtained whereby the winning of vanadium from source materials containing oxidic vanadium compounds of 6 percent by weight or more, the source material is roasted at a temperature above 800° C., and the material is then leached in a primary or first leaching step. The residue of the first leaching step is combined with alkali metal additives, and this mixture is roasted at a temperature in the range of 750° C. to 850° C.

The material emanating from this roasting step is leached in a secondary or second leaching step, preferably at a temperature of about 60° C.

Preferred additives for admixing to the residue of the primary leaching step are carbonates, chlorides, sulfates and nitrates of alkali metals, preferably sodium, or mixtures thereof.

Thus, in accordance with the invention the first roasting step is carried out in the absence of an alkali additive and at a relatively high temperature.

The steps of the first phase are combined with an alkali assisted roasting step, followed by a second leaching step. Surprisingly, despite a high vanadium content, no dilution with extraneous additives is required, thereby providing a leaner feed.

The first roasting step can be done in conventional equipment, for example, multiple hearth roasters, fluid bed reactors, and rotary kilns.

Leaching is carried out with water or soda (sodium carbonate) solution and part of the oxidized vanadium is leached from the roasted material. The conditions of this first stage can be selected in such a way that approximately 50% of the vanadium in the source material reports in the first leach solution.

Surprisingly, it was found that roasting in the absence of additives enables 50% or more of the vanadium of the feed to be leached out, particularly when using dilute soda (sodium carbonate) solution containing approximately 5% $Na_2CO_3$, despite the fact that in accordance with the reaction (1) above, representing the roasting step, sodium for forming $NaVO_3$ according to the equations (2) and (3) is not present.

In the second phase, the leach residue from the first leach step is roasted in the presence of the selected alkali additive or additives, and roasting is preferably carried out at a temperature of about 800° C. The balance of the vanadium is then extracted in the second leaching step.

The process achieves a number of important advantages. Because no inert additives need to be added, the energy required to heat such extraneous material can be saved and roasting capacity is not used by such additives. The low amount of alkali additives for roasting the first leach residue contributes to savings when sulfuric acid is used in a subsequent neutralization step employed in the further treatment of the vanadium-containing leach liquors. The capacity of existing roasting and leaching equipment can be considerably increased because no unnecessary ballast is carried along.

EXAMPLE I 1 kg of a blend of ground, vanadium-containing titaniferous magnetite furnace blowing slag and vanadium-containing fuel ash residues were pelletized with molasses. Roasting was carried out for 2 hours at a temperature of 900° C. in a rotary kiln. The pellets contained 12.5% vanadium on average. The roasted pellets were ground after cooling and leached at 90° C. in 5% sodium (sodium carbonate) solution for 1 hour. The analysis of the residue indicated that 61% of the vanadium content reported in the leach solution. The dried residue contained 6.4% vanadium.

The residue was mixed with 20% soda (sodium carbonate) and 2.5% sodium sulfate and tray roasted for 2 hours at 800° C. with occasional mixing. The cooled product was leached in water at 60° C. for 30 minutes. The analysis of the residue showed that 87% of the vanadium of the second roasting step reported in the leach solution.

EXAMPLE II 5 kg of ground vanadium-containing titaniferous magnetite blast furnace slag was roasted for 45 minutes at 900° C. in a fluid bed reactor. The slag contained 13.2% vanadium. The calcine was subsequently leached for 1 hour at 90° C. with 5% soda (sodium carbonate) solution. Analysis of the leach residue indicated that 69% of the vanadium was extracted into the leach solution. The dried residue analyzed 7.2% vanadium.

This residue was mixed with 25% soda (sodium carbonate) and 2.5% sodium sulfate, and tray roasted for 2 hours at 800° C. with occasional mixing. The cooled product was leached with water at 60° C. for 30 min. Analysis of the leach residue showed that 89% of the vanadium subjected to the second roasting step was recovered in the leach solution of the second leaching step.

We claim:

1. A process for the recovery of vanadium values from a source material containing at least 6% by weight oxidic vanadium compounds, said process comprising the steps of:

roasting the source material containing at least 6% by weight of oxidic vanadium compounds in an oxidizing atmosphere at a temperature in excess of 800° C. in a first roasting step without addition of alkali metal compounds for preparation of a product containing soluble vanadium values;

leaching the product containing soluble vanadium values in a first leaching step with an aqueous leach solution containing sodium carbonate to recover soluble vanadium values in the leach solution and to provide a residue containing vanadium values;

roasting said residue containing vanadium values in a second roasting step in admixture with an alkali metal compound selected from the group consisting of carbonates, chlorides, sulfates and nitrates of alkali metals and mixtures thereof, and at a temperature in the range of aobut 750° C. to about 850° C. for preparation of a roasted product containing soluble vanadium values; and leaching with water the roasted product containing soluble vanadium values from said second roasting step to recover the balance of the vanadium content of the source material.

2. The process as defined in claim 1 wherein the source material is pelletized with a binder.

3. The process of claim 2 wherein said binder is molasses.

4. The process as defined in claim 1 wherein the first leaching step is carried out with an aqueous solution containing approximately 5 percent sodium carbonate.

5. The process of claim 4 wherein approximately 50 percent of contained vanadium values are extracted into the solution of the first leaching step.

6. The process of claim 5 wherein the a first roasting step is carried out at a temperature of approximately 900° C.

* * * * *